Dec. 8, 1959    S. JUMENKO    2,916,381
TABLE DELICACY

Filed June 27, 1957    2 Sheets-Sheet 1

INVENTOR.
Sergej Jumenko
BY
Atty.

Dec. 8, 1959 S. JUMENKO 2,916,381
TABLE DELICACY

Filed June 27, 1957 2 Sheets-Sheet 2

INVENTOR.
Sergej Jumenko
BY Wilfred S. Stone
Atty.

United States Patent Office 2,916,381
Patented Dec. 8, 1959

2,916,381

TABLE DELICACY

Sergej Jumenko, Highwood, Ill.

Application June 27, 1957, Serial No. 668,515

3 Claims. (Cl. 99—107)

This invention relates to a table delicacy and to a method of making it. More particularly it relates to a small boned chicken, that is of a size sufficient for one serving, and which is tasty because the relationship of its parts are much the same as in an unboned and unskinned chicken.

The first object of this invention is to make two table delicacies having the appearance of a small chicken out of a single dressed chicken. The ordinary dressed chicken as it reaches the market weighs about two and one-half to three pounds. With all bones removed there is about 14 to 16 ounces of white and dark meat. This is more than is needed for a single serving and applicant seeks to provide two dressed chickens that may be served on a plate with a total of perhaps seven ounces of chicken in each serving.

The second object of this invention is to position the white meat across the back of the chicken so that with the bird in sitting position, the diner will cut into the white meat first.

Another object of the invention is to assure an erect positioning of the head during warming and during the initial cutting operation. A feature of the invention is the retention of the wing bone in association with the main breast of white meat and its insertion in the neck section of a mold.

These and such other objects as may hereinafter appear are attained by the embodiment shown in the accompanying drawings wherein.

Figures 1, 2:
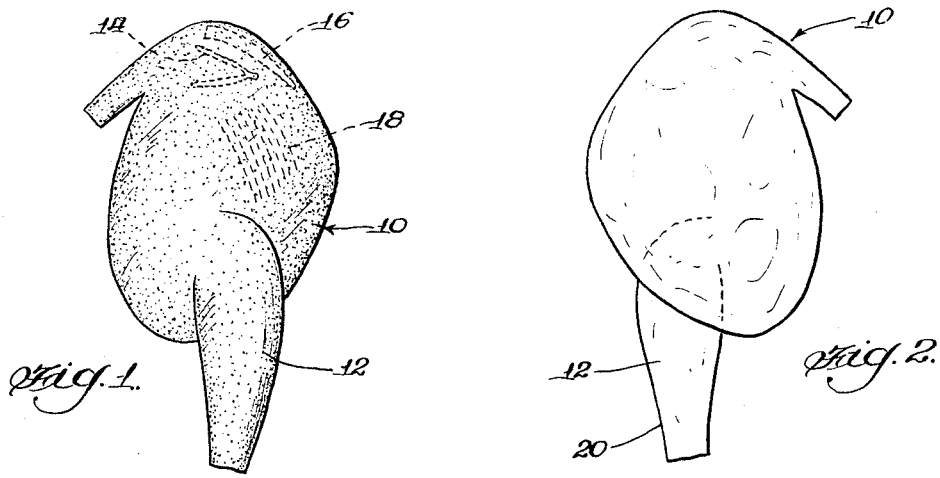
Figure 1 is a side view of a dressed chicken.
Figure 2 is a view of the same chicken cut in half with the skin down.

Continuing to refer to the drawings, the numeral 10 identifies a whole dressed chicken having a leg 12. The location of the wish bone, wing bone and breast bones, 14, 16 and 18 are generally indicated by dotted lines. Applicant's first step is to cut the chicken into exactly equal halves along the plane containing the back bone and the center of the breast. One-half is then laid on the work table with the skin down as suggested in Figure 2. Thereupon the breast bones and wish bones are removed. The wing bone is disjointed from the leg. Without separating the skin on the leg from the skin on the half of the chicken, the leg is pulled out. This is accomplished quite easily and leaves the skin 20 that had been around the leg 12 as a sleeve.

Next one removes the meat from the leg and grinds it. The ground dark meat is mixed with about three ounces of ground veal. Seasonings of salt and pepper and general poultry seasonings are mixed with the ground meats.

The next step is to remove all of the white meat from the skin, the white meat coming out as two pieces, the main breast and the small breast. The wing bone is still attached to the main breast. The main breast is then flattened by spreading out.

Figures 3, 4:
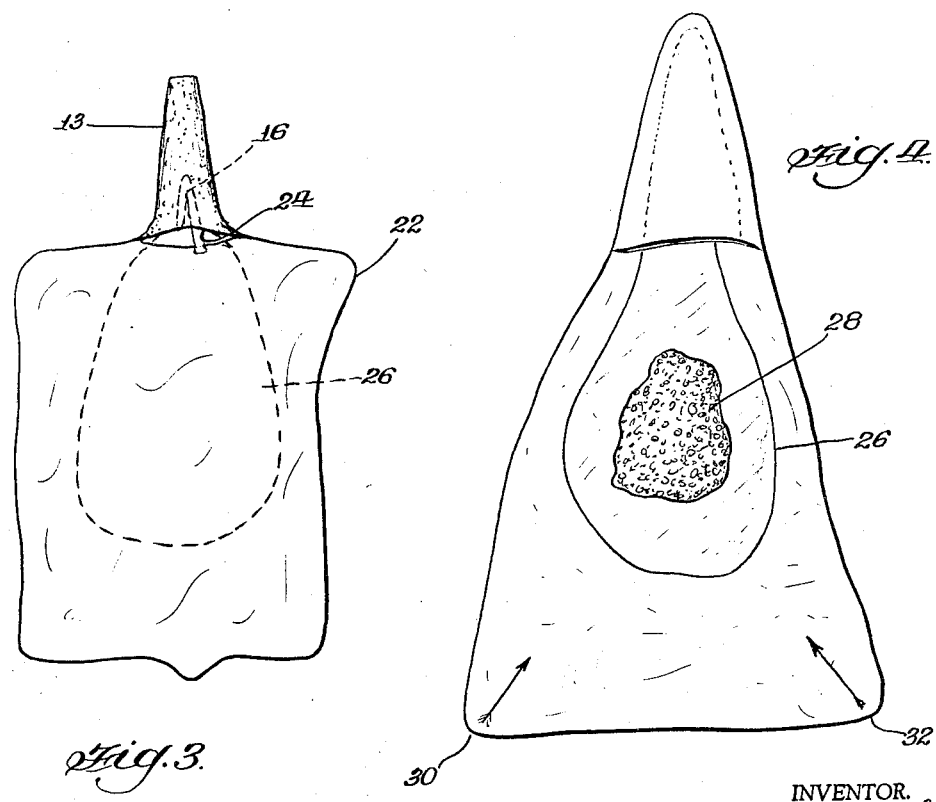
Figure 3 is a view of the skin only.
Figure 4 is a view of the skin partly filled with ground meat.

The first step in assembling the chicken components is to stuff some of the ground meat into the leg sleeve. Referring to Figure 3, the skin 22 is lying flat on the table, the ground meat is pushed into the opening 24 of the skin sleeve which bears the numeral 13. Thereupon the free end of the wing bone 16 is pushed into the neck. Some white meat will be drawn into the neck. This is desirable. The main breast which has been flattened will lie adjacent that portion of the skin which will become the back of the bird as indicated by the dotted line in Figure 3. Thereupon the balance of the chopped dark meat and veal 28 is laid upon the breast and then the small breast 29 is laid on the top of this, see Figure 8. Thereupon the ends 30 and 32 of the skin are wrapped around the meat. The whole is turned over on its side and placed in one-half of a greased metal mold 34, see Figure 5. The chef must exercise some skill at this point, but with a little practice the desired result is readily and quickly obtained. The wing bone 16 is to be in the position shown in Figure 5.

Figure 5:
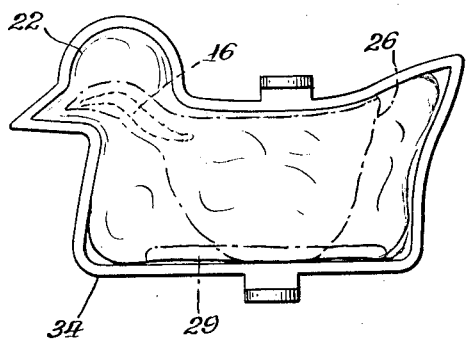
Figure 5 is a view of the chicken after it has been pressed into one-half of a mold.
Figure 6:
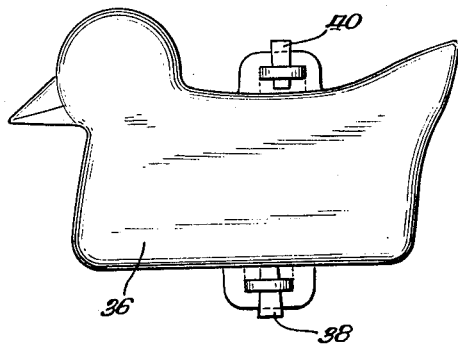
Figure 6 shows the mold after the second half has been placed in position.
Figure 7:
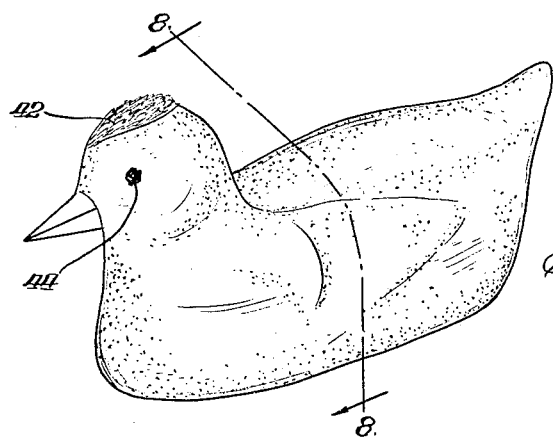
Figure 7 shows the finished product as removed from the mold.

Referring to Figure 5 the entire side of the mold is lined with the skin 22. There is of course overlapping of the skin particularly along the bottom center line. The breast 26 is not sufficiently large to completely enclose the ground meat, as indicated in Figure 5 by the dot-dash line because it is beneath the skin, as Figure 5 indicates. The long dash line indicates the position of the small breast. The balance of the inside of the chicken is the ground meat.

As stated, the whole is not very rigid and it is necessary when adding the second mold 36 to force the chicken up into the mold, tucking in the contents at the joints of the two mold halves. Pins 38 and 40 hold the two halves of the mold in asssembled relationship.

The product is next placed in an oven and baked at 450° F. for thirty-five minutes. After baking it is removed from the mold. The surface is glazed. The glaze is made by mixing two tablespoons of flour with one quart of water and bringing this mixture to a boil. Two beaten egg whites are added, one-half tablespoon of gelatin and yellow artificial food coloring. The glazed chicken is put back into the oven until the glaze has set. The chicken is finished with red coloring 42 for the comb and cloves 44 for the eyes.

Figure 8:
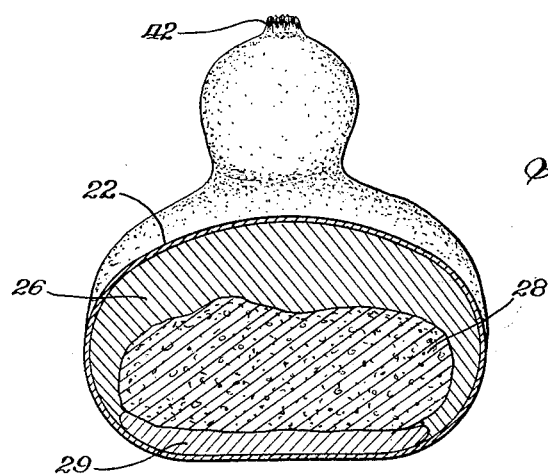
Figure 8 is a sectional view of the finished product taken on the line 8—8 of Figure 7.

The chicken may then be frozen or served. Referring to Figure 8, the center cross section of the chicken shows the skin 22, the principal breast 26, the chopped meat 28 and small breast 29.

Having thus described his invention, what inventor claims is:

1. The method of making a table delicacy having the appearance of a fowl which comprises the steps of boning one-half of a chicken with the exception of severing the wing bone from the main breast, of placing edible components in a mold having a portion for shaping a head, of positioning the wing bone with attached breast in the neck while spreading out the breast in the mold, and of baking the whole to form an edible product having the appearance of a fowl.

2. The method of making a table delicacy having the appearance of a fowl comprising the steps of severing a dressed fowl along a plane containing the back bone so as to form two equal halves each having a leg and wing, of removing the skin from one-half of the fowl so as to product a substantially flat membrane having an attached tubular skin sleeve which had been around the leg, of boning one-half of the chicken while leaving the wing bone only attached to the main breast, of separating the leg and the small breast, of grinding the leg meat and other dark meat components, of laying the skin on a flat surface with the sleeve downward, of forcing a portion of the ground components into the sleeve to form a neck and head, of flattening the main breast, of forcing the wing bone into the ground meat in the neck while flattening out the balance of the main breast on the skin, of positioning on top of the breast other ground edible components, of placing the small breast on top of the ground components, of wrapping the skin around these components, and placing the wrapped delicacy in a mold having a head and neck portion with the wing bone in the neck, whereby the ground portions will be on the interior of the product with the white meat immediately under the skin on the surface, and of baking the product to form an edible delicacy.

3. A baked table delicacy having the shape of a sitting fowl comprising a ground meat center, a wing bone attached to one-half of the main breast of a fowl spread over the top and sides of said ground meat with the wing bone directed upwardly toward one side, additional ground meat around the wing bone to form a neck and head, and a skin of the same fowl enclosing the whole, the same being shaped to resemble a sitting fowl with neck and head enclosed in skin.

References Cited in the file of this patent

UNITED STATES PATENTS

| | | |
|---|---|---|
| 2,633,601 | Snyder | Apr. 7, 1953 |
| 2,640,779 | George | June 2, 1953 |
| 2,844,844 | Sieczkiewicz | July 29, 1958 |
| 2,853,389 | Luchese | Sept. 23, 1958 |

OTHER REFERENCES

Complete Chicken Cookery, 1953, by Marian Tracy, published by The Bobbs-Merrill Company, Inc., New York, pp. 38 and 39.